United States Patent [19]

Schatschneider

[11] Patent Number: 4,732,796

[45] Date of Patent: Mar. 22, 1988

[54] REFRACTORY SHEATHING FOR PIPES IN PREHEATING FURNACES

[75] Inventor: Peter Schatschneider, Rommerskirchen, Fed. Rep. of Germany

[73] Assignee: Bloom Engineering (Europa) GmbH, Dusseldorf, Fed. Rep. of Germany

[21] Appl. No.: 842,451

[22] Filed: Mar. 21, 1986

[30] Foreign Application Priority Data

Mar. 29, 1985 [DE] Fed. Rep. of Germany ....... 3511606

[51] Int. Cl.⁴ .......................... F16L 9/22; F16L 59/12
[52] U.S. Cl. ...................................... 428/36; 432/234; 110/336; 138/147; 138/149; 138/155
[58] Field of Search .................. 428/36; 138/149, 155, 138/147, 174, 176; 432/233, 234, 236; 110/336; 24/455, 662, 155 R, 681; 411/525, 526, 527, 528

[56] References Cited

U.S. PATENT DOCUMENTS

| | | |
|---|---|---|
| 2,047,298 | 8/1934 | Tinnerman ............................ 411/527 |
| 2,197,220 | 4/1940 | Kost ...................................... 411/528 |
| 3,326,509 | 6/1967 | Kuttler ................................. 411/527 |
| 3,832,815 | 9/1974 | Balaz et al. .......................... 110/336 |
| 3,995,665 | 12/1976 | Monaghan ........................... 138/149 |
| 4,049,371 | 9/1977 | Prible .................................... 138/149 |
| 4,063,573 | 12/1977 | Harting et al. ....................... 138/155 |
| 4,386,630 | 6/1983 | Gapinski .............................. 138/149 |

FOREIGN PATENT DOCUMENTS

| | | |
|---|---|---|
| 3125440 | 6/1981 | Fed. Rep. of Germany . |
| 8407841 | 5/1984 | Fed. Rep. of Germany . |
| 7516444 | 12/1975 | France . |
| 2379750 | 10/1978 | France ................................. 432/234 |
| 1318352 | 5/1973 | United Kingdom ................ 432/234 |
| 2023269 | 12/1979 | United Kingdom . |

Primary Examiner—John E. Kittle
Assistant Examiner—Beth A. Bozzelli
Attorney, Agent, or Firm—Webb, Burden, Robinson & Webb

[57] ABSTRACT

A refractory sheathing (1) of incombustible, compressed, flat insulating bodies (8) made of mineral or ceramic fiber for thermally insulating pipes (10) in preheating furnaces fired from below in the steel industry is described. The insulating bodies (8) have an inner and, if desired, also an outer arc-shaped profile, they enclose the pipes (10) to be insulated totally or almost totally in circumferential direction, and they are secured at the pipe in close mutual abutment by at least two retainers which engage the ends of a plurality of adjacent insulating bodies (8) forming a stack of insulating bodies. The risk of separating from the pipe during the constant vibrations of the same is reduced and the space requirement for installation at the building site as well as the cost of mounting involved are scaled down by the line-up of a plurality of insulating bodies (8) on a plurality of spaced apart rods (11) to form a highly compressed insulating body stack. Between the retainers of the rods (11) acting at the ends, a plurality of compression holding clamps (16) are secured at mutual spacings. The tips (14) of the rods (11) may project beyond at least the one end face or butt face (23) of the insulating body stack which presents a prefabricated fibrous shaped section (2) and may be received in the end face or butt face (23) facing the same or in the retainer of the adjacent shaped section (2).

19 Claims, 23 Drawing Figures

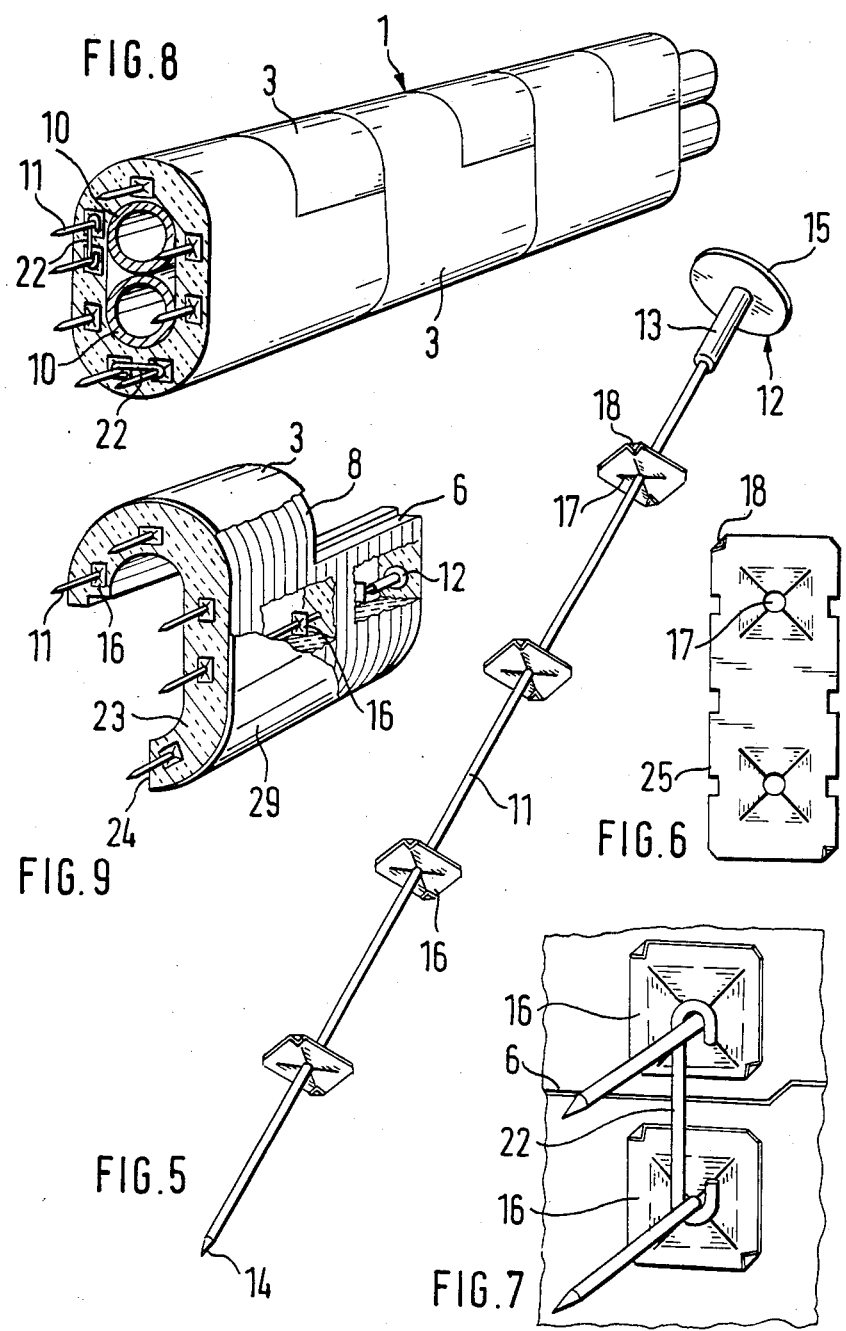

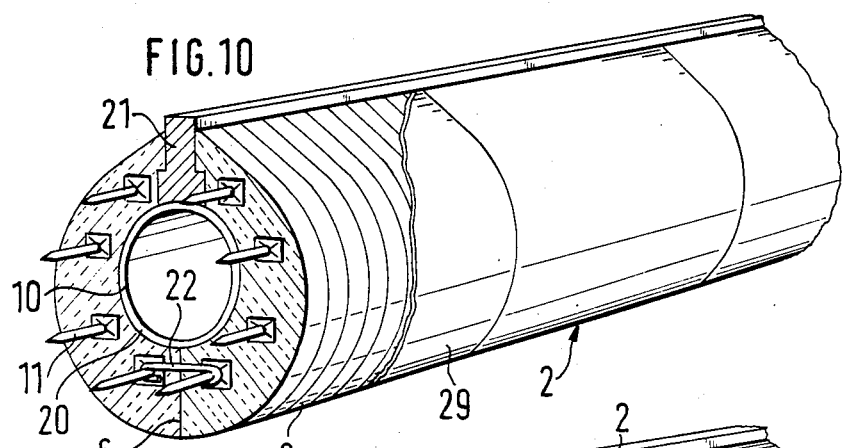
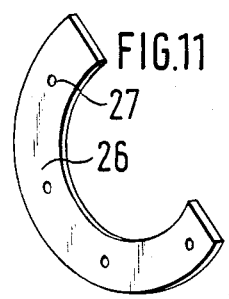
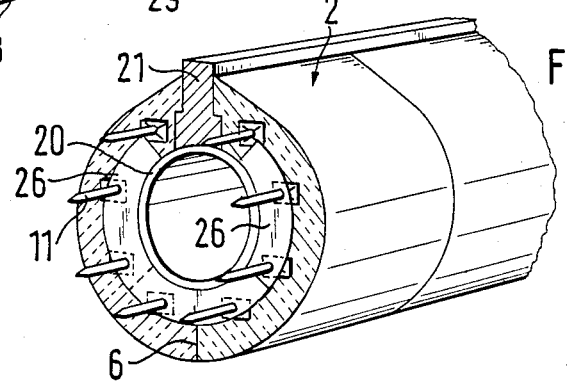
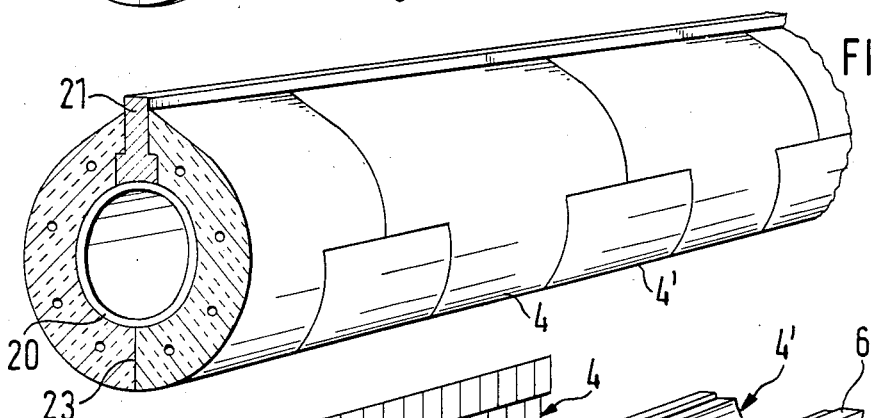
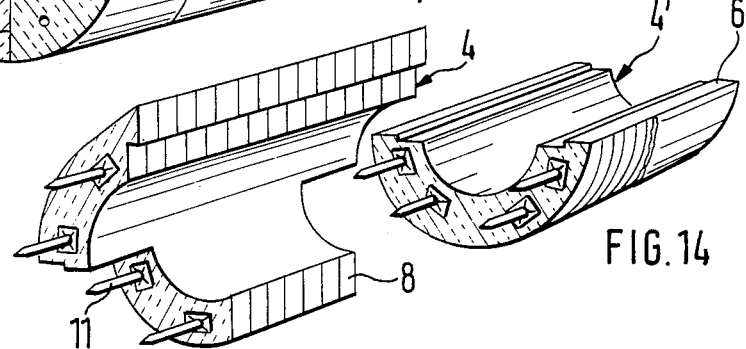

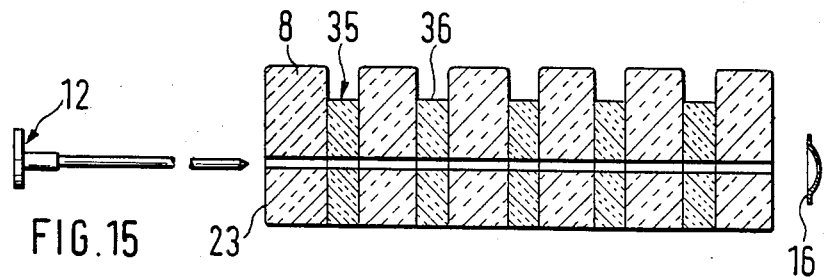
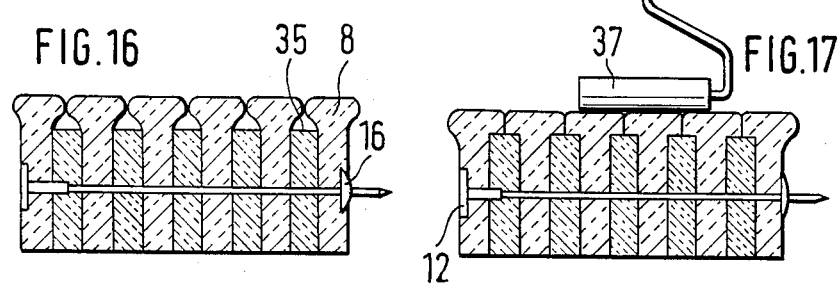
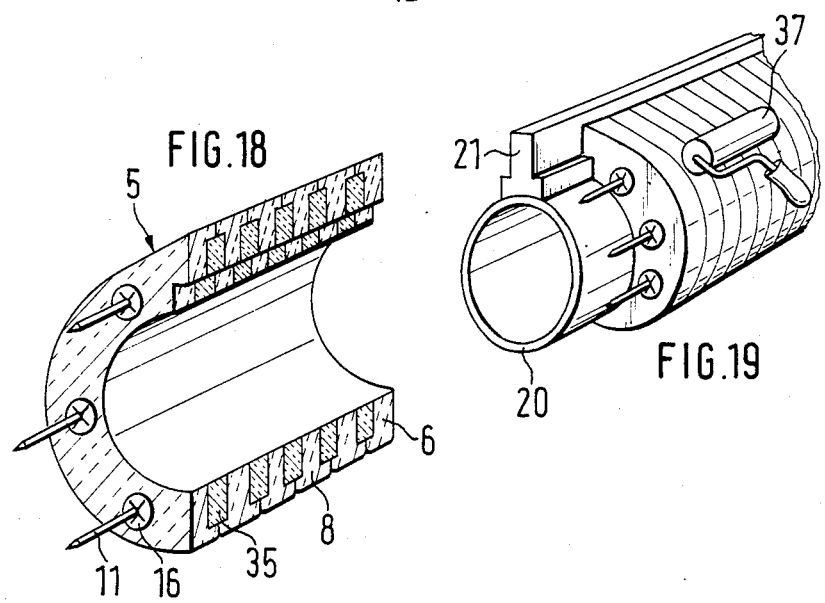

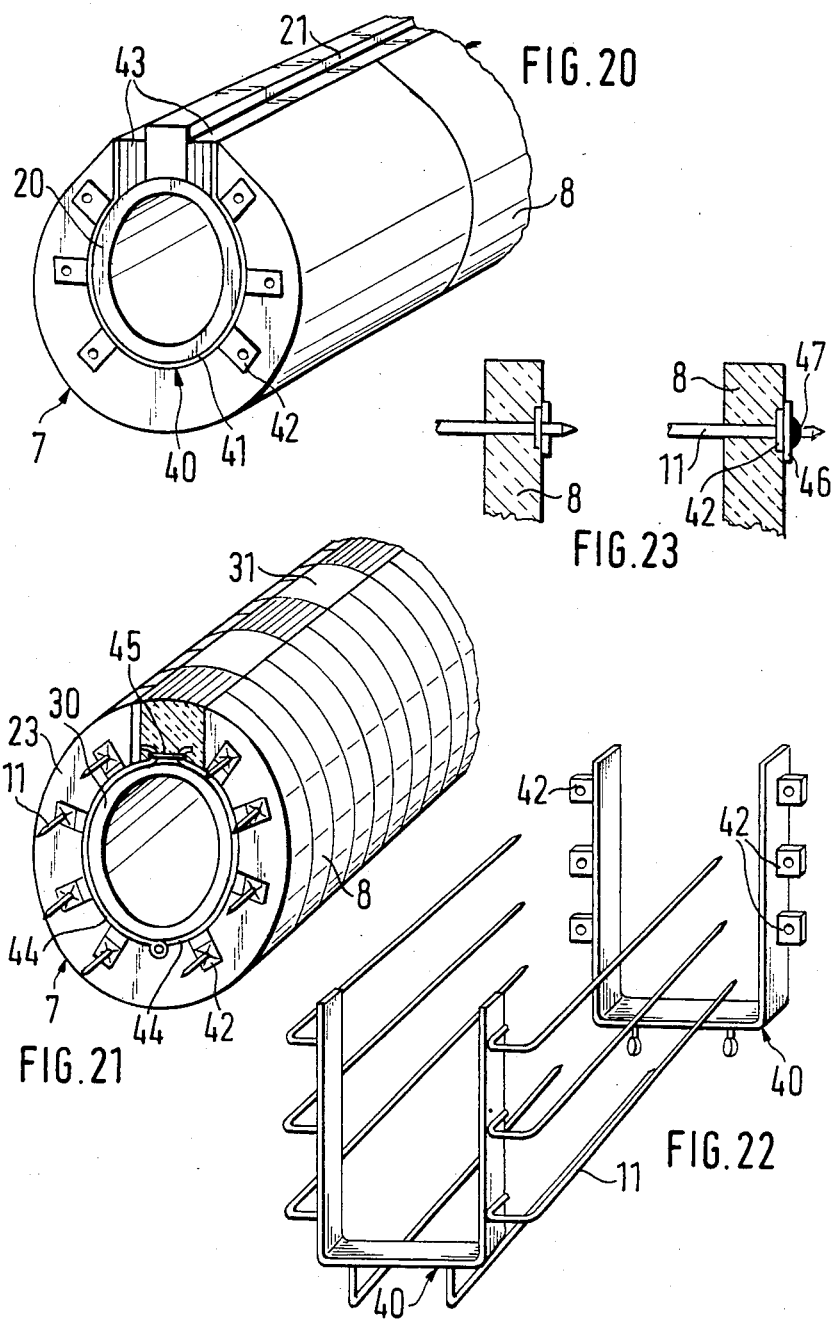

REFRACTORY SHEATHING FOR PIPES IN PREHEATING FURNACES

The instant invention relates to a refractory sheathing of incombustible, compressed insulating bodies made of mineral or ceramic fiber for thermally insulating pipes, skid pipes, supporting pipes, risers, or the like in preheating furnaces, especially fired from below, in pusher furnaces or walking beam furnaces. The insulating bodies have an inner and, if desired, also an outer arc-shaped profile, they enclose the pipe to be insulated totally or almost totally in circumferential direction, and they are secured at the pipe in close mutual abutment by at least two retainers which act at the ends of a plurality of adjacent insulating bodies forming a stack of insulating bodies.

A refractory sheathing for such pipes is known from DE-A1 No. 31 25 440. It is composed of a plurality of closely lined up slotted insulating bodies in the form of mineral or ceramic fiber rings enveloping the pipe. Adjacent rings are cemented together by their abutting end faces. The rings may be bonded directly by their peripheral surfaces on the pipe to be insulated or on metal fabric surrounding the same. Although this measure in general provides a good composite effect, it cannot be avoided that individual or several rings slotted crosswise become separated after extended operation of the furnaces at temperatures above some 1000° C. so that the pipe which must be insulated does not stay insulated sufficiently long against the high temperatures. Moreover, much space is required for storing and cutting the fiber rings because of their great raw volume.

FR-A No. 75 16 444 discloses a similar refractory sheathing composed of individual insulating bodies in the form of mineral fiber rings. In this case the slotted rings are slipped in closely abutting relationship on the pipe to be insulated, thus forming a stack of insulating bodies, and they are compressed in the direction of the longitudinal axis. In the case of this embodiment adjacent rings are not bonded or cemented together. Instead, the pipe is provided at either end of a stack with retainers having the shape of circular arcs and consisting of slotted flanged rings made of aluminum silicate. They are tightened against the pipe circumference by means of tie wire or clamps, and the rings are pressed together between them in the direction of the pipe axis. Also with this embodiment of a refractory sheathing it cannot be prevented with a sufficient degree of reliability that individual annular insulating bodies become loose because the retainers, tie wire, or the clamps which are exposed externally are not oxidation-proof or sufficiently resistant against the high temperatures existing in the interior of the furnace. Again there is the risk that, as time goes on, parts of the refractory sheathing will separate from the structural member to be insulated. This will require time consuming and expensive repair work and may perhaps involve even the exchange of severely damaged pipes.

Finally, a refractory sheathing of the kind mentioned initially is known (DE-GM No. 84 07 841) with which the retaining means for the annular fibrous insulating bodies comprise two narrow, approximately semicircular holding clips which are interconnected in hinge-like manner and tightened on the pipe by means of a chucking wedge. Pin or needle-like holding elements (spits) are fastened spaced from each other to the two lateral end faces of the holding clips as surface normals and so as to extend into the insulating bodies between the holding clips. In the case of this sheathing the insulating bodies which consist of a plurality of closely adjacent mineral or ceramic fiber rings or ring segments compressed in the direction of the longitudinal axis of the structural member are safely fastened to the pipe between the holding clips because the slotted rings or ring segments are slipped on the pin or needle-like holding elements and remain positively engaged with the pipe to be insulated, as they are not displaceable even under high temperature stress. Like the other sheathings mentioned, also this type of sheathing requires great expenditure for mounting and much storage space prior to the installation because the rings at first are not compressed. It proved that under high mechanical vibrational stress, such as occurring especially in preheating pusher furnaces it cannot be prevented that parts of the sheathing become loose because the annular insulating bodies are cut by the pin or needle-like holding elements.

All the known sheathings of mineral or ceramic fibers, no matter whether they are on the basis of aluminum silicate, aluminum oxide or zirconium oxide, are subject to extreme shrinking which may amount to more than 7% when heated to operating temperatures of 900° to 1200° C. such as typically occurring in the furnaces mentioned above which are fired from below. Even fibrous shaped members molded under vacuum still may shrink.

In the case of annular insulating bodies slotted at one side care must be taken when they are positioned in layers on top of or beside one another that the staple fibers extending in one direction are so aligned that adjacent staple fiber layers cross. If they were arranged in parallel, they could be separated mechanically from the fiber mat, and decay of the insulation would be the likely result because the pipe sheathing made in the furnace cannot be compressed very much and does not stay in compressed state because of the resiliency of the rings.

Increasing use is being made of the insulating sheathings mentioned here which are made of fibrous shaped sections because their volumetric weight is much less than that of ceramic bodies or ceramic shaped sections, including shaped sections which are interconnected in form lock and because their insulating effect is better, they can be assembled more easily and are self-supporting and permit a lighter structure so that they provide relief of the pipe construction.

It is an object of the instant invention to develop an insulating sheathing of the kind specified initially such that the risk of separation from the pipe during the constant vibration thereof is reduced and the space requirement for the insulation at the job site as well as the expenditure involved in the local assembly are decreased.

To meet this object it is provided in a sheathing of the kind mentioned initially that a plurality of insulating bodies made of mineral or ceramic fibers are lined up on a plurality of spaced apart rods to form a highly compressed insulating body stack, that a plurality of compression holding clamps are fixed spaced from each other on the rods between the retainers provided at the ends of the stack, and that the tips of the rods project beyond the end face or butt face of the insulating body stack forming a prefabricated shaped section. It is convenient if the tips of the rods are received in the end or butt face facing them or in the retainer of the adjacent shaped section so as to obtain a composite structure.

Compression holding clamps preferably are provided following each second or third insulating body. The compression holding clamps or fasteners may include claws or lugs protruding at least from one side and engaging the adjacent insulating bodies in order that the individual insulating bodies not only are held together in force lock but also connected in form lock with the rod. The embodiment is simple if the clamps are made in polygonal shape and the corners are bent like ears by approximately 90°, the bending alternating from one side to the other so as to establish engagement with both adjacent end faces of the insulating bodies. Instead of holding clamps which are especially easy to mount, discs may be used which are fixed on the rods by welding, or any other thrust bearings.

The novel sheathing permits very high compression or compaction of the mineral or ceramic fibers during the manufacture of the shaped sections so that there is no longer any risk of layers becoming detached. For this reason the staple fibers need not be crossed, let alone be hooked up or anchored by additional fibers threaded in vertical direction. The great density obtainable during manufacture is distributed uniformly throughout the length of the shaped section because compression holding clamps (fasteners) are provided at regular spacings, preferably following each second or third insulating body or ring. In this manner insulating bodies having a starting density of 128 kg/m$^3$ can be compressed at least to twice this density. The compression preferably is carried on up to 250 to approximately 300 kg/m$^3$.

The rods are made of heat-resistant material which should have a temperature stability up to 1150° C. and especially include proportions of approximately 25% of chromium and 20% of nickel. As prefabricated shaped sections are made of great density, there is no great space requirement at the job site for storing the shaped sections made in the factory, prior to their assembly. The assembly is rendered easy because the shaped sections merely need be fastened to the pipes, especially by bonding or cementing. Usually it is not necessary to apply special retaining members to the pipes. The above mentioned shrinking is cut down to minimum values because of the lasting precompression of the insulating bodies (rings) and the resulting high density. If the rods do not project or if their projecting tips extend no further than into individual insulating bodies provided between adjacent shaped sections, such shaped sections may be exchanged individually.

Shaped sections having approximately half-shell shape are useful for insulating horizontal pipes which receive for instance skid pipes and vertical pipes upon connection with other pipes. These shaped sections have the tips of the rods protrude freely and are interconnected mechanically at both sides at least of the one butt joint in parallel with the pipe, especially by means of clips, slip-on or plug-type plates or holding clamps, such as plug-type fasteners. Upon bonding to the pipe the respective opposed half shells first are connected to each other by means of the clips or slip-on plates bridging the butt joints, and subsequently further adjacent shaped sections are added.

In another embodiment especially destined for horizontal skid pipes which cannot be enclosed completely by the insulation because the skid bar must project upwardly above the insulation to permit the slabs or metal blanks to be heated to be slid across, it is convenient to design the approximately half-shell shaped sections such as to be stepped in longitudinal direction so that shaped sections which are contiguous in circumferential and longitudinal directions form a closed composite structure. Such a design of meshing shaped sections is known per se from ceramic shaped sections serving to insulate the pipes in the preheating furnaces mentioned.

A modification of this embodiment provides for even more reliable retention especially on horizontal skid pipes by having two flat semicircles which overlap each other above the butt surface in parallel with the pipe axis inserted between the end faces of adjacent shaped sections. Rods of both approximately half-shell shaped sections penetrate these semicircles in the overlapping area, and the semicircles engage the pipe at least at the side opposite the butt face which is in parallel with the pipe axis.

It may be convenient to reinforce the shaped sections, e.g. the half shells at the lower butt face which is parallel to the pipe axis or directed axially. There they may be connected by double hooks or double holding clamps in front of the end faces if they cannot be joined at upper parting lines because of the presence of a skid bar. The double hooks or double holding clamps for connection always are provided in the end face or butt face of the shaped section, which face preferably is designed like a labyrinth, and slipped on the rod ends protruding from the one end face. This provides for safe connection of the prefabricated shaped sections around the pipe. The stepped arrangement alone of the shaped sections and the connection of the rods of adjacent shaped sections guarantee safe retention of the shaped section around the pipe.

It may be sufficient for the insulation of risers (vertical pipes) to hold together in pipe direction or connect the shaped sections which may be of half-shell shape by rods and slipped-on compression holding clamps tips of which extend beyond both end faces of the shaped sections and dig directly into the adjacent shaped sections. The shaped sections should be of a design to have a stepped butt face and be installed in overlapping condition. In this manner different shaped sections can be avoided, such as right and left ones, whereby assembly and storage are facilitated. No connecting plates or hooks need be located between the shaped sections. The shaped sections may be pierced directly by the rods. They have an arresting effect because the insulation is self-supporting. This embodiment can be mounted very quickly. The outline of the sheathing also may be rectangular, especially square in cross section and may be provided with a protective layer.

Additional securing is useful also in the case of physically stable shaped sections because with horizontal pipes, especially skid pipes they are merely suspended from the upper portion of the pipe located above the pipe center. Apart from the measures recited in claim 7 securing is obtained if the insulating bodies are cemented together at least in the area of the ends of their lateral end faces in order to prevent the upper part of the shaped sections from being bent open. Such spar bonding between the individual fibrous insulating bodies stabilizes the shape.

Suitable substances for bonding are chemical ceramic adhesives which reach great strength at room temperature already. At rising temperatures the strength also rises so that the spar bonding no longer permits any deformation of the shaped section.

Claims 12 to 15 characterize another embodiment and modifications of shaped sections likewise especially well suited for horizontal pipes including a skid bar or support heads. The shaped section having only one longitudinal joint is integral and embraces the entire periphery of the pipe to be insulated. The two butt faces in parallel with the pipe axis extend around the pipe and abut against each other or against the side surfaces of a skid bar or close to the same, leaving free a sealing joint. For application to the pipe, the shaped section is opened so that the pipe may be passed through the separating joint. This is followed by closing and, if desired, connecting of the ends of rods disposed at either side of the butt faces in parallel with the pipe axis. The outermost insulating body is fixed on the rods by annular discs and these in turn are supported on a welding spot applied on the rod. This arrangement permits the rod which expands upon heating to extend into an adjacent shaped section.

Especially high inherent stability of the shaped sections is obtained in accordance with another modification of the invention by the provision of a physically stable, preformed insulating body of annular sectional shape having a density of at least approximately 250 kg/m$^3$ between two each of fibrous insulating bodies, the preformed insulating body having a smaller radial extension than the fibrous insulating body. The ends standing out of the fibrous insulating bodies are molded or flanged across the outer surfaces of the physically stable insulating bodies. These preformed, highly compressed insulating bodies which may be cut out of ceramic fiber insulating boards formed or pressed under vacuum fulfill a function similar to the spar bonding described above, namely that of stabilizing the shape. Another useful effect is obtained by the interposed fibrous insulating bodies whose outer diameter is greater than that of the highly compressed insulating bodies. Compressing these lined up insulating bodies causes the longer compressible fibrous insulating bodies to be squeezed out. This projecting part of the fibrous insulating bodies is flanged firmly on the end faces of the highly compressed insulating bodies or rolled by means of a roller. If the shaped section should shrink under the influence of high temperature, the overlapping resulting from the above prevents thermal radiation from reaching the rods.

It is advantageous to provide the shaped sections at the outside with a protective layer approximately 0.5 to 5 mm, especially approximately 1 to 1.5 mm thick, to be applied either during manufacture or, if desired, upon assembly only. This will provide further protection of the shaped sections from exterior influences, such as the temperature, chemical or mechanical stresses. The material used for this purpose is to be of higher quality than that of the fibers. Preferably it has a zirconium silicate base which solidifies chemically (e.g. aluminum phosphate). The substance is applied by means of a spray gun and the spraying pressure shoots it between the fibers at a maximum particle size of about 1 mm. This results in an intimate bonding between the fiber and the coating. The shaped sections or the fibers at the outside thus are coated permanently. In this manner the fibers are protected in the best possible way against chemical influences and any mechanical or thermal attack. This greatly reduces the risk that the fibers become vitrified or brittle and shrink, as is the case with fibers exposed freely to the furnace atmosphere.

It proved to be advantageous to preconsolidate the shaped sections prior to installation by heating them to from 120° C. to 450° C. The exposure to heat all around results in a certain degree of preshrinking so that the residual shrinking during operation is extremely small. Moreover, this increases the strength of a given protective layer which then acts like a thin-walled ceramic shell.

The shaped sections can be installed easily and quickly and the costs involved are low. It is convenient in assembling the prefabricated members to provide them at the inside with a special adhesive and to bond them to the outer wall of the pipe to be insulated. This bonding provides corrosion protection against acid attack if the point of condensation is failed to be reached at the pipe surface. Moreover, it adds to the retention of the shaped sections at the pipe.

Upon compression, the rods may serve to hold the shaped sections in position from both ends. The retention at one end preferably may be embodied by a collar sleeve slipped on the end of the rod and having a tubular shaft which takes up the rear end of the rod on which the insulating bodies are lined up as well as the tip of the rod of an adjacent shaped section. Thus all rods are guided in adjacent shaped sections. However, the retention at one end of the shaped section also may be in the form of a slipped on compression holding clamp having two locking apertures, one of which receives the rear end of the rod, while the other one accommodates the tip of the rod of an adjacent shaped section. In this case the rods should extend somewhat obliquely in the shaped section in order to meet also the further locking aperture which is laterally offset. Such a further locking aperture also may be formed in the end face of the collar of the collar sleeve engaging the shaped section. Furthermore, the retainers also may be embodied by simple discs or the like. They merely must be adapted to be fastened firmly to the rear end of the rod and receive the tip of the rod of an adjacent shaped section to hold the same unless the tips of the rods in the case of vertical insulations dig directly into the insulating bodies of the shaped sections. Fundamentally the novel sheathing requires no retainers, clips, clamps, or the like which must be fixed, especially welded to the pipe. The prefabrication of the shaped section reduces the space requirement and assembly time at the job site. The high compression and especially the preconsolidation by precontraction caused by heat pretreatment results in low shrinkage during use. The quality control of the manufacture of the shaped sections is not carried out at the job site but instead in the factory. The precompressing of the individual fibrous insulating bodies is permanent. The shaped sections can be produced for any kinds and arrangements of pipes. In spite of the reinforcement by the rods and compression holding clamps, the prefabricated shaped sections obtained are light and may be installed conveniently. All insulating bodies may be made from commercially available insulating mats or boards. As the outer profile of the shaped structural members need not be adapted to the inner one, the members also may be angular.

The invention will be described further, by way of example, with reference to the accompanying drawings, in which:

FIG. 5 is perspective view of a rod including a slipped-on collar sleeve and slipped-on compression holding clamps;

FIG. 6 shows a compression holding clamp;

FIG. 7 illustrates a connecting clip for rod tips protruding at either side of a separating joint in parallel with the pipe axis or extending axially between two abutting shaped sections;

FIG. 8 is a perspective view of an insulation made of shaped sections for horizontal double pipes;

FIG. 9 shows a stepped insulating shaped section of the sheathing presented in FIG. 8;

FIG. 10 is a perspective view of a sheathing composed of half-shell shaped sections for a skid pipe;

Figures 1, 2, 3, 4:
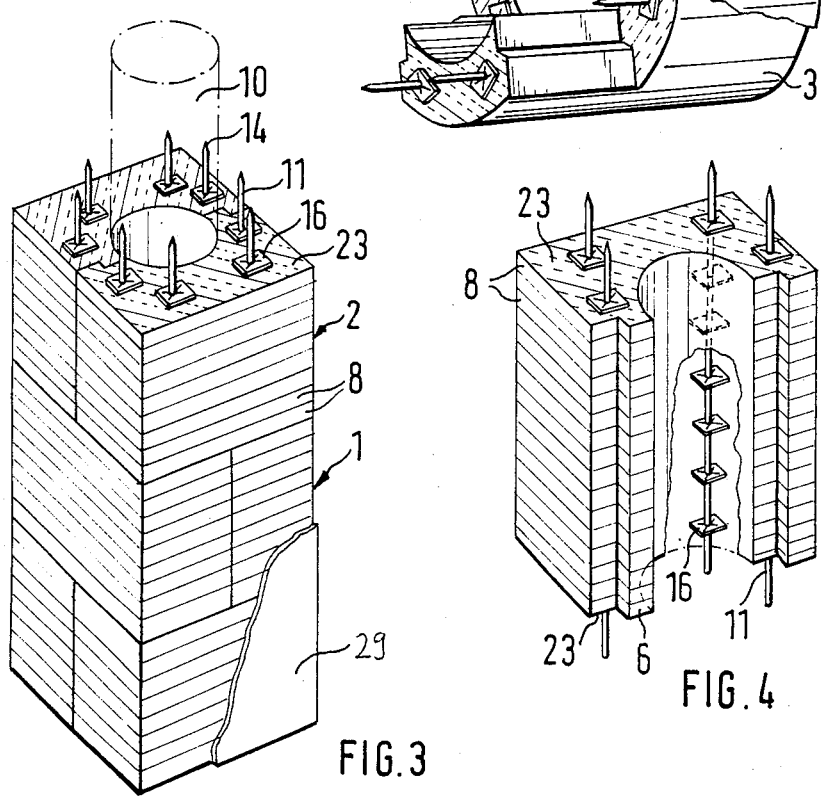
FIG. 1 is a perspective view of a sheathing composed of a plurality of stepped shaped sections for horizontal pipes.
FIG. 2 shows a shaped section of the sheathing shown in FIG. 1.
FIG. 3 is a perspective view of a sheathing composed of shaped sections of equal height arranged offset for a riser.
FIG. 4 shows a shaped section of the sheathing illustrated in FIG. 3.

FIG. 11 presents a flat semicircle adapted to the pipe outline;

FIG. 12 shows the end face of two shaped sections including two semicircles slipped on the rods;

FIG. 13 is a perspective view of a sheathing of stepped shaped sections for a skid pipe;

FIG. 14 presents two shaped sections of the sheathing shown in FIG. 13;

FIG. 15 is a cross sectional elevation of fibrous insulating bodies and preformed, highly compressed insulating bodies at the beginning of the assembly;

FIG. 16 shows the stack of insulating bodies according to FIG. 15 in compressed state;

FIG. 17 shows the stack according to FIG. 15 upon flanging of the fibrous insulating bodies which are standing out;

FIG. 18 is a perspective view of a half-shell shaped section produced in accordance with FIGS. 15 to 17;

FIG. 19 is a perspective view of a shaped section according to FIG. 17 assembled on a skid pipe;

FIG. 20 is a perspective view of a skid pipe including a continuous skid bar and a shaped section encircling the same integrally and adapted to be bent open;

FIG. 21 is a perspective view of a supporting pipe having individual support heads and a shaped section encircling the same integrally and adapted to be bent open;

FIG. 22 shows two retainers for the insulating body stack of a rigid shaped section or one to be bent open suitable for double pipes or rectangular pipes;

FIG. 23 presents a detail of the fixing of an outer fibrous insulating body on the tip of a rod of a shaped section adapted to be bent open.

Pipe sheathings 1 in accordance with the invention may be gathered from FIGS. 1, 3, 8, 10, 12, 19, 20, and 21. As shown in FIGS. 3, 10, 5, 8, and 19, they may consist of half-shell shaped sections 2 or of stepped shaped sections 3, as shown in FIGS. 8, 4 and 13. Two or more thereof may be supplemented to form a full shell. It is also possible for shaped members 7 to encircle the pipe integrally, as shown in FIGS. 20 and 21. The side or butt faces 6 extending axially or in parallel with the pipe axis of the half shell or stepped shaped sections do not become engaged along a planar axial butt face but instead along a stepped side face constituting a labyrinth so that the passage of heat radiation is prevented. The individual shaped sections 2, 3, 4, and 5 each consist of a plurality of flat insulating bodies 8 made of refractory mineral or ceramic fibers and bent to ring, shell, or arc shape, as seen in profile. The pipes 10 or 20 to be insulated are enclosed partly by these shaped sections alone or completely or almost completely by composite structures of shaped sections. The shaped sections are mounted in close engagement with the pipes. A plurality of flat insulating bodies 8 form a stack of insulating bodies.

The insulating bodies 8 are lined up on a plurality of spaced apart rods 11 extending parallel to the pipe axis, one of these rods being shown alone in FIG. 5. At one end, the rod may comprise an end retainer in the form of a collar sleeve 12 the shaft 13 of which takes up the rear end of the rod 11 at the front end. The collar or end plate 15 serves for abutment of a first annular insulating body 8. The shaft 13 of the collar sleeve 12 is tubular. The tip 14 of another rod 11 may be introduced into the rear part of the shaft 13. Upon lining up from two to four insulating bodies 8 on the rod 12 a flat compression holding clamp 16 designed as fastener is slipped on. This clamp is formed with a central locking aperture 17 by which it may become fixed in position on the rod 11. The locking aperture 17 is provided in the form of a hole of somewhat smaller diameter than the rod 11 and has cuts starting radially from the edge of the hole. The compression holding clamp 16 is of rectangular shape. Its corners are bent alternatingly in opposite directions by approximately 90° to form claws 18. When several insulating bodies have been lined up, they are strongly compressed so as to provide a high volumetric weight of, for example, 300 kg/m³. Subsequently more insulating bodies 8 are lined up and again fixed by a compression holding clamp 16. Such a compression fastener finally abuts the end face of the last insulating body 8. The stack of insulating bodies thus formed constitutes a prefabricated shaped section 2, 3, 4, or 5. In the case of the stepped shaped sections 3, such as shown in FIGS. 7 or 14, the insulating bodies have different cross sectional shapes. As the shaped sections are longer in some areas and shorter in others, the length of the rods 11 must be adapted accordingly. The tips 14 of the rods 11 project beyond the end face or radial butt face 23 of the shaped sections so as to be introduced into the retainers of an adjacent shaped section where they are to be held. If collar sleeves in accordance with FIGS. 5 and 9 are provided, rods may be introduced into the rear end of the tubular shaft 13. However, it is possible also to provide compression holding clamps having two closely adjacent locking apertures at the ends of the rods. In that case the tip 14 is introduced into the aperture next to the aperture receiving the rod end. It may be convenient to make the rods increasingly long in order to facilitate the introduction of the rod tips into retainers of adjacent shaped sections.

The sheathing shown in FIG. 3 for risers 10 is composed of fibrous half-shell shaped sections 2 of equal height having an arcuate inner contour adapted to the outer contour of the riser 10 and a rectangular outer contour. The axial butt faces 6 are stepped in the manner of a labyrinth. The axial end faces 23 of the shaped sections 2 are planar. The shaped sections 2 are bonded not only to the outside surface of the riser 10 but also to each other at their end or butt faces. The rods 11 project beyond both end faces 23 and are inserted directly into the outer insulating bodies 8 of adjacent shaped sections 2. With the structure shown which is offset by 90° in layers there is no risk that the sheathing will become detached or fall apart because the arrangement is made upright. This is so especially if the shaped sections are cemented together and to the pipe. Upon assembly the sheathing is provided with a thin protective layer as will be explained with reference to FIG. 9.

In the case of the embodiment comprising stepped shaped sections as shown in FIGS. 8 and 9 two each of such shaped sections form one complete sheathing portion. Yet the shaped sections also may be designed as shown in FIGS. 13 and 14 in which case stepped half-shell shaped sections 4 are mounted opposite each other at the pipe to be insulated and supplemented each by a smaller half-shell shaped section 4'. This design is especially well suited for skid pipes 20 provided at the top with a continuous skid bar 21 which projects a little above the sheathing or for supporting pipes 30 having support heads 31, as shown in FIG. 21.

In the case of the embodiment illustrated in FIG. 10 the individual portions of the sheathing each are composed of two half-shell shaped sections 2, the lower area as seen in FIG. 10 being of greater wall thickness than the upper area so that the two half shells may support each other reliably at that location. In the upper area, on the other hand, they simply lie on the outside of the skid pipe 20. Clips 22 as shown especially in FIG. 7 serve to connect the half shells or shaped sections. They engage the rod tips at either side of an axial butt face 6. Such clips 22 also may be replaced by double holding clamps 25 as shown in FIG. 6.

The modification shown in FIG. 12 of the sheathing according to FIG. 10 is composed of half-shell shaped sections of uniform wall thickness. An especially firm seat of the shaped sections 2 on the skid pipe 20 is guaranteed by two semicircles 26 shown in FIG. 11 and formed with apertures or bores 27 in accordance with the rods 11. These semicircles are slipped on the rods 11 such that they overlap each other in the area of the axial butt faces 6 of the shaped sections which abut each other in parallel with the axis. The semicircles each are positioned on two rods 11 at either side of the axial butt faces 6 or longitudinal butt joint. The apertures 27 are so arranged that the semicircles engage the skid pipe and their inner contour is adapted accordingly to the outer contour of the skid pipe. The radial extension of the semicircles 26 is smaller than the thickness of the shaped sections so that they will be protected against heat radiation from the furnace chamber. The insulating bodies may be bonded together in layers at least in the end portions adjacent the skid bars or support heads so as to provide even greater strength in the upper area when applied to skid pipes.

The shaped sections 3 are provided with a protective layer 29 to be seen especially in FIG. 9 and serving to protect the same against external stresses. The protective layer is a thin layer on zirconium silicate base which is applied by spraying.

In the embodiment shown in FIGS. 15 to 19 the shaped sections 5 are made alternatingly of compressible fibrous insulating bodies 8 and physically stable, preformed, highly compressed insulating bodies 35 of annular sectional shape having a density of 260 kg/m³ and higher. When one or two fibrous insulating bodies 8 have been lined up a compression holding clamp 16 (not shown) is slipped on to hold the fibrous insulating bodies 8 upon compression in highly compressed state. These fibrous insulating bodies 8 stand out radially beyond the highly compressed insulating bodies 35 and are rolled against the outside surfaces 36 thereof, for example by means of a hand roller 37 as shown in FIGS. 17 and 19. For fixing, subsequently a protective layer corresponding to protective layer 29 according to FIG. 9 is applied by spraying. This overlapping laminated structure prevents thermal radiation from reaching the reinforcing rods 11. The inner cross sectional shape of the insulating bodies is adapted to the pipe. This is required especially in the case of skid pipes 20 as shown in FIG. 19 if the skid bar 21 rests on the skid pipe 20 by an enlarged foot.

The shaped sections 7 shown in FIGS. 20 and 21 are adapted to be bent open and encircle a skid pipe 20 or a supporting pipe 30 in integral manner from the bottom up to close to the sides of the skid bar 21 or the support heads 31. They are formed with rods 11 which do not protrude beyond the one end face 23 or do so only a little. With this embodiment longitudinal abutting or longitudinal joints are avoided which might cause the risk of opening during operation. Retainers 40 provided at both ends of the shaped section and coming to lie around the pipe permit sufficient opening or bending open of a shaped section 7 made of fibrous insulating bodies 8 as well as subsequent closing in order to apply the same to the pipe.

In the case of the embodiment shown in FIG. 20 the retainers consist of a bracket 41 made of resilient sheet material, bent in accordance with the pipe outline, and having radially protruding lugs 42 of sheet material to receive the rods 11. The rods 11 are fastened, especially welded to the lugs 42 of the one bracket 41, whereas the lugs of the other bracket are formed with apertures or bores through which pass the tips of the rods. Behind the lugs, an annular disc 46 and a welding spot 47, as shown in FIG. 23, are applied on the tips of the rods so that, while a rod cannot draw back, the tip of the rod when heated may slide farther through the lug. Upon application of the shaped section 7 the ends of the bracket 41 may be attached to the skid pipe 20 laterally of the skid bar 21. Subsequently a filling layer 43 is introduced at both sides of the skid bar.

The embodiment of retainers 40 shown in FIG. 21 consists of two curved sheet material pieces 44 of the same size pivotably connected at one end and formed with radially projecting lugs 42 to receive the rods 11. The sheet material pieces 44 are bent over at their upper ends where they may be held together upon assembly by tie wire 45 or a double hook between the support heads 31.

The gap remaining between the support heads 31 may be closed by a prefabricated insulating member or filler substance.

The shaped sections 7 may be disassembled individually without having to remove other shaped sections.

FIG. 22 is a cross sectional presentation of rectangular retainers 40 made of resilient sheet material. The rods 11 which are bent twice at one end are welded to one of these retainers. The other retainer takes up the tips of the rods in bores formed in radially projecting flat iron lugs 42. Annular discs 46 are slipped on the tips of the rods and subsequently secured by a welding spot 47 to serve as thrust bearings, as may be taken from FIG. 23.

What is claimed is:

1. A refractory sheathing of incombustible, compressed, flat insulating bodies made of mineral or ceramic fiber for thermally insulating pipes, skid pipes, supporting pipes, risers, and the like in preheating furnaces, pusher furnaces, or walking beam furnaces, the insulating bodies having an inner and, if desired, also an outer arc-shaped profile, enclosing the pipe to be insulated totally or almost totally in circumferential direction, and being secured at the pipe in close mutual abutment by at least two retainers which act at the ends of a plurality of adjacent insulating bodies forming a stack of insulating bodies, characterized in that a plurality of insulating bodies are lined up on a plurality of spaced apart rods to form a highly compressed insulating body stack, in that a plurality of compression holding clamps are fixed spaced from each other on the rods between insulating bodies and the retainers provided at the ends of the stack, and in that the tips of the rods project beyond the end face of the stack of insulating bodies forming a prefabricated shaped section.

2. The sheathing as claimed in claim 1, characterized in that the compression holding clamps are provided following every second or third insulating body.

3. The sheathing as claimed in claim 1, characterized in that the compression holding clamps comprise claws or lugs protruding from at least one side and engaging in the adjacent insulating bodies.

4. The sheathing as claimed in claim 1, characterized in that the stack of insulating bodies has a density on the order of at least 250 kg/m$^3$.

5. The sheathing as claimed in claim 4, characterized in that the body stack has a density of 250 to 300 kg/m$^3$.

6. The sheathing as claimed in claim 1, characterized in that the tips of the rods are received in the end face or butt face facing them or in a retainer of the adjacent shaped section.

7. The sheathing as claimed in claim 6, characterized in that the retainer at the one end of the shaped section is embodied by a collar sleeve slipped on the end of the rod and having a tubular shaft which takes up the rear end of the rod and the tip of the rod of an abutting shaped section.

8. The sheathing as claimed in claim 6, characterized in that the retainer at the one end of the shaped section is embodied by a slipped-on compression holding clamp having two locking apertures, one of which takes up the rear end of the rod and the other one the tip of the rod of an abutting shaped section.

9. The sheathing as claimed in claim 1, characterized in that the shaped sections are designed to have approximately half-shell shape and the rods are interconnected mechanically at both sides at least of the one axial butt face, especially by means of clips or slip-on plates (holders).

10. The sheathing as claimed in claim 1, characterized in that shaped sections enclosing the pipe in part only are designed to be stepped in longitudinal direction such that shaped sections which are contiguous in circumferential and longitudinal directions constitute a closed composite structure.

11. The sheathing as claimed in claim 9 or 10, characterized in that the axial butt faces of mutually abutting shaped sections are stepped or formed with a groove and tongue.

12. The sheathing as claimed in claim 9 or 10, especially for skid pipes, characterized in that flat semicircles which overlap each other over each axial butt face are inserted between the end faces of mutually abutting shaped sections, the rods of both shaped sections penetrating the semicircles in the overlapping area and the semicircles engaging the pipe at least at the side opposite the axial butt face.

13. The sheathing as claimed in claim 9, characterized in that the insulating bodies are cemented together at least in the area of the ends facing the axial butt faces of their lateral end faces.

14. The sheathing as claimed in claim 9, characterized in that a physically stable, preformed insulating body of annular sectional shape and a denisity of at least 250 kg/m$^3$ is inserted between two each of fibrous insulating bodies and has a radial extension less than that of the fibrous insulating body, and in that the ends standing out of the fibrous insulating bodies are molded or flanged across the outer surfaces of the physically stable insulating bodies.

15. The sheathing as claimed in claim 9, characterized in that the shaped sections are provided at the outside with a protective layer especially on the basis of zirconium or silicate and having a thickness of from 0.5 to 5 mm.

16. The sheathing as claimed in claim 1, especially for skid pipes or supporting pipes, characterized in that the shaped section surrounds the pipe substantially completely continuously and the retainers permit the shaped section to be opened for application to the pipe.

17. The sheathing as claimed in claim 16, characterized in that the retainers consist of resilient sheet material having radially protruding lugs for the rods.

18. The sheathing as claimed in claim 16, especially for smooth pipes and supporting pipes having support heads, characterized in that the retainers consist of two sheet material pieces which are articulated to each other and have protruding lugs for the rods, and at their ends facing each other the sheet material pieces include bends or projections for connection upon application to the pipe.

19. The sheathing as claimed in claim 16, characterized in that the insulating body from which projects the tip of the rod is fixed by an annular disc slipped on the rod and resting axially on a thrust bearing provided on the rod, especially in the form of a welding spot.

* * * * *